3,458,556
ACYLOXYAMINOSILANES

Joel F. Di Paola, Cohes, N.Y., assignor to General Electric Company, a corporation of New York
No Drawing. Filed Oct. 20, 1966, Ser. No. 587,965
Int. Cl. C07f 7/18, 7/10
U.S. Cl. 260—448.8    9 Claims

ABSTRACT OF THE DISCLOSURE

Acyloxyaminosilanes having the formula $$(RR'N)_a (R\overset{O}{\underset{\parallel}{C}}O)_b (R''O)_c (Y')_{4-a-b-c}Si$$

are disclosed. The title compounds find use as crosslinking agents for room temperature vulcanizing silicone elastomers.

---

This invention relates to a new class of reactive organosilicon compounds which are especially useful as curing or cross-linking agents for room temperature vulcanizing silicone elastomer compositions.

In particular, the reactive organosilicon compounds of the present invention contain at least three reactive groups attached to silicon. These compositions have the formula:

(1) $(RR'N)_a(YO)_b(R''O)_c(Y')_{4-a-b-c}Si$ where R is a monovalent hydrocarbon radical free of aliphatic unsaturation; R' is hydrogen or a monovalent hydrocarbon radical free of aliphatic unsaturation of the same scope as R; R'' is an alkyl radical; Y is a monovalent acyl radical of an aliphatic monocarboxylic acid having from one to six carbon atoms; Y' is a monovalent hydrocarbon radical free of aliphatic unsaturation of the same scope as R; $a$ is a whole number equal to from 1 to 2, inclusive; $b$ is a whole number equal to from 1 to 2, inclusive; $c$ is a whole number equal to from 0 to 2, inclusive; and the sum of $a$ plus $b$ is from 2 to 3, inclusive; and the sum of $a$ plus $b$ plus $c$ is a whole number equal to from 3 to 4, inclusive.

From the foregoing description of the compositions within the scope of the present invention, it can be seen that these compositions can contain up to one silicon-bonded monovalent hydrocarbon radical, must have at least one silicon-bonded amino group, must have at least one silicon-bonded acyloxy group, can have up to three total silicon-bonded amino and acyloxy groups, can have up to two silicon-bonded alkoxy groups, and must have at least three total amino, alkoxy, and acyloxy groups.

The compositions within the scope of Formula 1 are prepared by first reacting a chlorosilane having the formula:

(2) $(Cl)_{a+b}(R''O)_c(Y')_{4-a-b-c}Si$ with an amine having the formula:

(3) RR'NH to produce an amino-substituted silane having the formula:

(4) $(RR'N)_{a+b}(R''O)_c(Y')_{4-a-b-c}Si$

This amino-substituted silane is reacted with an acid having the formula:

(5) Y'OH to produce the compositions of the present invention. In Formulas 2 through 5, the letters and subscripts have the same meanings as set forth for Formula 1.

The chlorosilanes of Formula 2 are known in the art and include compositions such as methoxytrichlorosilane, dimethoxydichlorosilane, ethoxytrichlorosilane, diethoxydichlorosilane, isopropoxytrichlorosilane, diisopropoxydichlorosilane, t-butoxytrichlorosilane, methylmethoxydichlorosilane, etc. The amines within the scope of Formula 3 are, of course, well known in the art and include methylamine, diethylamine, methylethylamine, methylisopropylamine, isopropylamine, t-butylamine, etc.

Reaction of the amine of Formula 3 with the chlorosilane of Formula 2 is readily effected by mixing the amine and the chlorosilane, holding the reaction mixture at an elevated temperature for a short period of time, and isolating the desired aminosilane of Formula 4. The reaction between the amine of Formula 3 and the chlorosilane of Formula 2 theoretically involves two moles of the amine per gram atom of silicon-bonded chlorine in the chlorosilane. The reaction between the amine and each silicon-bonded chlorine results in an amine group becoming attached to silicon and in the formation of a molecule of the hydrochloride of the amine involved. In practice, it is found that a slight excess over the theoretical amount of amine is desirably employed, so that approximately 2.2 moles of the amine of Formula 3 is employed in the reaction for each gram atom of silicon-bonded chlorine. Generally, the amine is slowly added to a solution of the chlorosilane in a suitable solvent, such as toluene, at a temperature of about 90° C. The reaction mixture is then refluxed for a short time, cooled, and the amine hydrochloride precipitate is filtered. The filtrate is then generally stripped of solvent and fractionally distilled to yield the desired aminosilane of Formula 4.

Illustrative of various aminosilanes within the scope of Formula 4 are tri(n-butylamino)methylsilane,
tri(isopropylamino)methylsilane,
tri(isopropylamino)phenylsilane,
tri(dimethylamino)methylsilane,
di(isopropylamino)-(methoxy)methylsilane,
tri(isopropylamino)-t-butoxysilane,
di(isopropylamino)dimethoxysilane,
diethoxydi(isopropylamino)silane,
tri(dimethylamino)-t-butoxysilane, etc.

The reaction between the aminosilane of Formula 4 and the carboxylic acid of Formula 5 to produce the acyloxyaminosilanes of Formula 1 is effected by merely mixing the two reactants, preferably in a low boiling solvent, at a low temperature, and isolating the desired product. The reaction between the carboxylic acid and the aminosilane involves two moles of the acid for each mole of silicon-bonded amine which it is desired to replace with an acyloxy group. When two moles of the acid are employed for one mole of silicon-bonded amino groups, the result is the replacement of the amino group with the acyloxy radical, with the concurrent formation of the carboxylate of the amine. This reaction occurs readily at temperatures on the order of 0° C. and isolation of the desired reaction product is facilitated by using stoichiometric quantities of the two reactants. Since the products of Formula 1 contain either one or two silicon-bonded acyloxy groups, it is apparent that the carboxylic acid of Formula 5 is reacted in the ratio of either two or four moles per mole of the aminosilane of Formula 4. A very useful low boiling solvent for conducting the reaction is diethyl ether and, in general, the reaction is most readily effected by slowly adding the acid to a solution of the amine in the ether, filtering the precipitated amine carboxylate, and then stripping the ether solvent from the reaction mixture, resulting in the desired acyloxyaminosilane of Formula 1.

Illustrative of the acyloxyaminosilanes of Formula 1 are acetoxydi(isopropylamino)methylsilane,
acetoxydi(isopropylamino)phenylsilane,
diacetoxy(isopropylamino)phenylsilane,
acetoxy(isopropylamino) (methoxy)methylsilane,
acetoxydi(isopropylamino) tertiarybutoxysilane,
acetoxy(isopropylamino)dimethoxysilane,
acetoxy(diethoxy)isopropylaminosilane,
acetoxydi(dimethylamino)tertiarybutoxysilane,
butyroxy(methylphenylamino)(propoxy)methylsilane,
etc.

The description of the compositions falling within the scope of Formulas 1 through 5 illustrates a number of the values which can be represented by the letters and subscripts in the above formulas. However, it should be understood that this invention is related to a class of compounds broader than those specifically named above and includes those materials in which the monovalent hydrocarbon radicals free of aliphatic unsaturation which are represented by R include, for example, alkyl radicals, e.g., methyl, ethyl, propyl, butyl, octyl, octadecyl, etc. radicals; aryl radicals e.g., phenyl, naphthyl, tolyl, xylyl, etc. radicals; aralkyl radicals, e.g., benzyl, phenylethyl, etc.; cycloalkyl radicals, e.g., cyclohexyl, cycloheptyl, etc. radicals, as well as monovalent hydrocarbon radicals free of substituents which are reactive under the conditions of the reaction. Illustrative of such inert substituents for purposes of the present reaction can be mentioned, for example, halogen, nitro, etc. Specific radicals with inert substituents include, for example, chlorophenyl, dibromophenyl, chloromethyl, perfluoroethyl, perfluoromethylethyl, nitrophenyl, etc. radicals. In the preferred embodiment of my invention, the radicals represented by R are lower alkyl radicals or phenyl radicals, with the preferred radicals being methyl, ethyl, and propyl. The radicals represented by R' include all of the radicals previously mentioned for R and, in addition, include hydrogen. The preferred radicals within the scope of R' are lower alkyl radicals or hydrogen. The radicals represented by R'' are alkyl radicals, preferably methoxy to t-butoxy, but include other alkyl radicals having from one to about twelve or more carbon atoms. The monovalent acyl radicals represented by Y are the limited group of materials containing from one to six carbon atoms and include the formyl group, the acetyl group, the propionyl group, the butyryl group and the caprylyl group. The preferred group represented by Y is acetyl. The group represented by Y' is of the same scope as the group represented by R, but preferably is methyl or phenyl.

The acyloxyaminosilanes of the present invention are useful as intermediates in the formation of more complex organopolysiloxanes of many types. However, one of the principal uses for the materials is the use as a cross-linking agent for so-called room temperature vulcanizing silicone elastomers. This use is described and claimed in my copending application Ser. No. 587,974, now U.S. Patent 3,355,480 (Docket 8DW–709) filed concurrently herewith and assigned to the same assignee as the present invention. This copending application is hereby incorporated by reference into the present application for purposes of illustrating the details of the utility of the present compositions, although such use is shown in the examples which follow.

The following examples are illustrative of my invention and are not intended for purposes of limitation. All parts are by weight.

Example 1.—Preparation of acetoxy(isopropylamino)-
(methoxy)methylsilane

To a reaction vessel was added 106.1 grams (1.0 mole) trimethylorthoformate dropwise to 149.6 g. (1.0 mole) stirred methyltrichlorosilane maintained at 40 to 45° C. Evolution of methylchloride gas began almost immediately and the gas was vented. After the addition was completed, the reaction mixture was held at 40 to 45° C. for one hour, cooled and fractionally distilled to yield 96.2 g. (66.3% yield) of methylmethoxydichlorosilane which had a boiling point of 79 to 80° C. To a second reaction vessel was added 90.0 g. (0.62 mole) methylmethoxydichlorosilane and 1500 ml. dry toluene. This mixture was heated to a temperature of 70° C. and 161.0 g. (2.73 moles) isopropylamine was slowly added dropwise. After the addition, the reaction mixture was refluxed for one hour, cooled, filtered through diatomaceous earth to remove a precipitate, the filtrate was stripped of toluene at atmospheric pressure, and fractionally distilled to produce 79.2 g. of methylmethoxydi-(isopropylamino)silane having a boiling point of 53° C. at 5 mm. This corresponded to a 67.1% yield. Chemical analysis of this material showed the presence of 14.98% nitrogen as compared with the theoretical value of 14.71%. To a third reaction vessel containing 38.0 g. (0.2 mole) methylmethoxydi(isopropylamino)silane in 100 ml. anhydrous ether at −10° C. was slowly added 24 g. (0.4 mole) glacial acetic acid over a three hour period under a nitrogen blanket. The resulting solution was filtered, the precipitate was washed with additional ether which was added to the filtrate, and the filtrate was subsequently stripped of ether solvent yielding 37.6 g. (98.3% yield) of acetoxy(isopropylamino)(methoxymethylsilane having the formula

Chemical analysis of this material showed the presence of 6.91% nitrogen and 28.1% acetoxy radicals as compared with the theoretical values of 7.37% nitrogen and 31.0% acetoxy radicals. When 2.5 g. of this material were mixed with 100 g. of a silanol chain-stopped dimethylpolysiloxane having a viscosity of about 3500 centistokes at 25° C., the resulting material was tack-free within one hour and cured to a tough, clear silicone rubber upon exposure to the atmosphere for 16 hours.

Example 2.—Preparation of acetoxydi(isopropylamino)-
methylsilane

Following the general procedure of Example 1, methyltrichlorosilane was reacted with isopropylamine to produce methyltri(isopropylamino)silane which is a water-white liquid having a boiling point at 64° C. at 3 mm. To a reaction vessel was added 21.7 g. (0.1 mole) of the methyltri(isopropylamino)silane in 50 ml. ether and 12.0 g. (0.2 mole) glacial acetic acid was slowly added over a one hour period while the reaction mixture was maintained at a temperature of −10° C. At the end of this time, the reaction mixture was treated by filtration and stripping to produce 19.8 g. (a 91.0% yield) of acetoxydi(isopropylamino)methylsilane having the formula: ([CH₃]₂CHNH)₂(CH₃COO)(CH₃)Si. Chemical analysis of this material shows the presence of 12.16% nitrogen and 23.81% acetoxy groups as compared with the theoretical values of 12.80% nitrogen and 22.10% acetoxy groups. Following the general procedure of the preceding example, 2.5 g. of this material was mixed with 100 g. of a silanol chain-stopped dimethylpolysiloxane having a viscosity of about 3500 centistokes at 25° C. and, upon exposure to moisture present in the atmosphere, the mixture cured to a tough elastic material within 15 minutes.

Example 3.—Preparation of acetoxydi(isopropylamino)-
tertiarybutoxysilane

To a stirred solution of 374.0 g. (2.2 moles) silicon tetrachloride in 2000 ml. dry benzene at 10 to 15° C. was slowly added 174.0 g. (2.2 moles) pyridine. Then 148.2 g. (2.0 moles) tertiary butanol were added dropwise while the reaction mixture was maintained at a temperature of 15 to 25° C. The reaction mixture was then maintained at this temperature for 16 hours, filtered to remove salts, the benzene was stripped at atmospheric pressure, and the resulting material was fractionally distilled to produce tertiary butoxytrichlorosilane having a boiling point of 133 to 134° C. The identity of this material was confirmed by chlorine analysis which showed the presence of 51.0% Cl as compared with the theoretical values of 51.3% Cl. Following the procedure of the preceding examples, the tertiary butoxytrichlorosilane was reacted with isopropyamine to produce tri(isopropylamino)tertiarybutoxysilane which was a water-white liquid boiling at 83 to 84° C. at 3 mm. Then, following the procedure of earlier examples, 13.8 g. (0.05 mole) of the silane was reacted with 6.0 g. (0.1 mole) of glacial acetic acid to produce acetoxydi(isopropylamino)tertiarybutoxysilane having the formula:

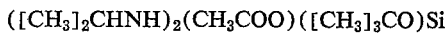

This was a clear, colorless liquid. The chemical identity of this material was confirmed by chemical analysis which showed the presence of 9.18% nitrogen and 17.16% acetoxy as compared with theoretical values of 10.10% nitrogen and 21.4% acetoxy. This material was used to convert a silanol chain-stopped dimethylpolysiloxane fluid to a cured silicone rubber employing the material at the 2.5% level.

Example 4.—Preparation of acetoxydi(dimethylamino)tetriarybutoxysilane

Following the procedure of earlier examples, t-butoxytrichlorosilane was reacted with dimethylamine to produce t-butoxytri(dimethylamino)silane which was a water-white liquid having a boiling point of 60° C. at 3 mm. Following the procedure of earlier examples, 23.3 g. (0.1 mole) of the silane was reacted with 12.0 g. (0.2 mole) of glacial acetic acid to produce 23.4 g. (94.3% yield) of acetoxydi(dimethylamino)tetriarybutoxysilane having the formula:

This was a clear, colorless liquid. The identity of this material was confirmed by chemical analysis which showed the presence of 10.95% nitrogen and 21.90% acetoxy groups as compared with the theoretical values of 11.30% nitrogen and 23.80% acetoxy. This material also proved useful as a curing agent for silanol chain-stopped dimethylpolysiloxane fluids.

Example 5.—Preparation of acetoxy(isopropylamino)dimethoxysilane

Following the procedure of Example 1, silicon tetrachloride was reacted with trimethyl orthoformate to produce dimethoxychlorosilane which has a boiling point of 98 to 101° C. This material was then reacted with isopropylamine to produce dimethoxydi(isopropylamino)silane, which was a water-white liquid having a boiling point of 76 to 78° C. at 10 mm. Following the procedure of earlier examples, 41.2 g. (0.2 mole) of the silane was reacted with 24.0 g. (0.4 mole) of glacial acetic acid to produce 40.7 g. (98.3% yield) of acetoxy(isopropylamino)dimethoxysilane having the formula:

([CH$_3$]$_2$CHNH)(CH$_3$COO)(CH$_3$O)$_2$Si

This was a liquid. The identity of this material was confirmed by chemical analysis which showed the presence of 4.78% nitrogen and 25.80% acetoxy groups as compared with the theoretical values of 6.76% nitrogen and 28.50% acetoxy groups. This material was also useful for the curing of room temperature vulcanizing silicone elastomer compositions.

Example 6.—Preparation of acetoxy(isopropylamino)diethoxysilane

Following the procedure of Example 1, silicon tetrachloride was reacted with triethyl orthoformate to produce diethoxydichlorosilane which had a boiling point of 133 to 136° C. This material was then reacted with isopropylamine to produce diethoxydi(isopropylamino)silane which was a water-white liquid having a boiling point of 85° C. at 9.5 mm. Following earlier procedures, 23.4 g. (0.1 mole) of the silane were reacted with 12.0 g. (0.2 mole) glacial acetic acid to produce 22.0 g. (93.8% yield) of acetoxy(isopropylamino)diethoxysilane which has the formula: ([CH$_3$]$_2$CHNH)(CH$_3$COO)(C$_2$H$_5$O)$_2$Si. This was a clear liquid. The identity of the product was confirmed by analysis which showed the presence of 5.69% nitrogen and 22.09% acetoxy groups as compared with the theoretical values of 5.96% nitrogen and 25.10% acetoxy. This material was also used to cure a 4,000 centistoke silanol chain-stopped dimethylpolysiloxane by mixing 2.5 parts of the silane with 100 parts of the siloxane. This material became tack-free in 90 minutes and completely cured in 20 hours at room temperature.

Example 7.—Preparation of acetoxydi(isopropylamino)phenylsilane

Following the procedure of earlier examples, phenyltrichlorosilane was reacted with isopropylamine to produce phenyltri(isopropylamino)silane which was a water-white liquid having a boiling point of 83° C. at 0.3 mm. Following the procedure of earlier examples, 55.9 g. (0.2 mole) of the silane were reacted with 24.0 g. (0.4 mole) glacial acetic acid to produce 53.6 g. (98.4% yield) of acetoxydi(isopropylamino)phenylsilane having the formula:

clear liquid. When 2.5 parts of the silane was added to 100 parts by weight of a 3500 centistoke silanol chain-stopped dimethylpolysiloxane, the resulting mixture had cured to the tack-free state within two minutes and had cured completely to a tough silicone rubber within one-half hour.

Example 8.—Preparation of diacetoxy(isopropylamino)phenylsilane

Another portion (27.9 g., 0.1 mole) of the phenyltri(isopropyylamino)silane of Example 7 was reacted with 24.0 g. (0.4 mole) of glacial acetic acid to produce 27.9 g. (99.3% yield) of diacetoxy(isopropylamino)phenylsilane which has the formula:

([CH$_3$]$_2$CHNH)(CH$_3$COO)$_2$(C$_6$H$_5$)Si

This was a clear liquid. When 5 parts of this silane was added to 100 parts of a 20,000 centistoke silanol chain-stopped dimethylpolysiloxane, the mixture cured to the tack-free state within two minutes and to a solid rubbery material after exposure to the atmosphere for thirty minutes.

Example 9.—Preparation of butyroxy(butylamino)(methoxy)hexylsilane

Following the procedure of Example 1, hexyltrichlorosilane is reacted with trimethyl orthoformate to form hexylmethoxydichlorosilane. This is reacted with butylamine to produce hexylmethoxydi(butylamino)silane, which is then converted to the desired produce by reaction with butyric acid to produce butyroxy(butylamino)(methoxy) hexylsilane having the formula:

(C$_4$H$_9$NH)(C$_3$H$_7$COO)(CH$_3$O)(C$_6$H$_{13}$)Si

This material is employed the same as the other products within the scope of the present invention to cure room temperature vulcanizing silicone elastomers and to cure silanolterminated diorganopolysiloxanes.

While the foregoing examples have illustrated many of the specific compositions within the scope of the present invention, it should be noted that these compositions include the broad variety of materials within the scope of Formula 1. These compositions include those in which the silane contains both silicon-bonded acyloxy groups and silicon-bonded amino groups. Additionally, compositions within the present invention include those which contain the two types of groups mentioned above, plus alkoxy groups. In all cases, the compositions of the present invention contain at least three reactive groups selected from alkoxy, acyloxy, or amino groups, with at least one of the groups being acyloxy, and with at least one of the groups being amino, and with no more than three total groups being acyloxy plus amino. Additionally, compositions within the scope of the present invention can contain one monovalent hydrocarbon radical or monovalent hydrocarbon radical substituted with an inert substituent, such as a halogen or a nitro group.

What I claim as new and desire to secure by Letters Patent of the United States is:

1. Acyloxyaminosilanes having the formula:

$$(RR'N)_a(YO)_b(R''O)_c(Y')_{4-a-b-c}Si$$

where R and Y' represent monovalent hydrocarbon radicals free of aliphatic unsaturation; R' is a member selected from the class consisting of hydrogen and monovalent hydrocarbon radicals free of aliphatic unsaturation; R'' is an alkyl radical; Y is a monovalent acyl radical of an aliphatic monocarboxylic acid having from one to six carbon atoms; $a$ is a whole number equal to from 1 to 2, inclusive; $b$ is a whole number equal to from 1 to 2, inclusive, $c$ is a whole number equal to from 0 to 2, inclusive; the sum of $a$ plus $b$ is from 2 to 3, inclusive; and the sum of $a$ plus $b$ plus $c$ is a whole number equal to from 3 to 4, inclusive.

2. Acyloxyaminosilanes of claim 1 in which $c$ is equal to 0.

3. Acyloxyaminosilanes of claim 1 in which the sum of $a$ plus $b$ plus $c$ is equal to 3.

4. Acyloxyaminosilanes of claim 1 in which the sum of $a$ plus $b$ plus $c$ is equal to 4.

5. Acyloxyaminosilanes of claim 1 in which Y' is a member selected from the class consisting of methyl and phenyl.

6. Acyloxyaminosilanes of claim 1 in which Y is an acetyl radical.

7. Acyloxyaminosilanes of claim 1 in which R'' is methyl.

8. Acyloxyaminosilanes of claim 1 in which R'' is t-butyl.

9. Acyloxyaminosilanes of claim 1 in which R'' is ethyl.

References Cited

UNITED STATES PATENTS

| | | | |
|---|---|---|---|
| 3,294,739 | 12/1966 | Weyenberg | 260—448.8 XR |
| 3,133,110 | 5/1964 | Morehouse et al. | 260—448.2 |
| 3,296,161 | 1/1967 | Kulpa | 260—448.2 XR |
| 3,296,195 | 1/1967 | Goossens | 260—448.2 XR |
| 3,305,525 | 2/1967 | Goossens | 260—448.2 XR |
| 3,364,175 | 1/1968 | Di Paola | 260—448.2 XR |

TOBIAS E. LEVOW, Primary Examiner

J. P. PODGORSKI, Assistant Examiner

U.S. Cl. X.R.

260—46.5, 448.2